United States Patent

[11] 3,585,866

| [72] | Inventor | Willis B. Ensinger<br>Silver Springs, Md. |
|---|---|---|
| [21] | Appl. No. | 838,100 |
| [22] | Filed | July 1, 1969 |
| [45] | Patented | June 22, 1971 |
| [73] | Assignee | Singer-General Precision, Inc.<br>Little Falls, N.J. |

[54] GYROSCOPE FLEXURE HINGE SUSPENSION
13 Claims, 15 Drawing Figs.

[52] U.S. Cl. ...................................................... 74/5,
  64/27, 308/2 A
[51] Int. Cl. ........................................................ G01c 19/18
[50] Field of Search ............................................ 74/5; 308/2,
  2 A; 64/11, 15, 27

[56] References Cited
UNITED STATES PATENTS

| 2,937,053 | 5/1960 | Rigney | 308/2 |
|---|---|---|---|
| 2,960,302 | 11/1960 | Brown | 308/2 |
| 3,081,552 | 3/1963 | Reason | 74/5 X |
| 3,288,541 | 11/1966 | Tracy | 308/2 |
| 3,354,726 | 11/1967 | Krupick et al. | 74/5 |
| 3,384,424 | 5/1968 | Raines | 308/2 |
| 3,512,419 | 5/1970 | Stiles | 64/15 X |

*Primary Examiner*—Manuel A. Antonakas
*Attorneys*—S. A. Giarratana and S. M. Bender ABSTRACT: An improved flexure hinge suspension for use in free-rotor displacement type gyroscopes is provided comprising an inner hinge unit and an outer hinge unit concentrically nested one within the other in a generally parallel manner coaxial with the gyro's spin or reference axis. Each hinge unit, in turn, comprises a frictionless, four-bar, two-axis, universal-joint suspension element for supporting the gyro's inertial flywheel relative to the spin axis in a particular directional mode. That is, in the outer hinge unit, the flexure bars have their respective longitudinal axes arranged perpendicular to the spin axis so as to support the flywheel against torsional and radial displacements relative to the spin axis while in the inner hinge unit the flexure bars have their respective longitudinal axes oriented parallel to the spin axis so as to support the flywheel against axial displacements along the spin axis. In each hinge unit the flexure bars comprise locally thin necked-down sections formed by machining a corresponding pair of closely spaced holes completely through the peripheral wall of each unit as the case may be. Thus, when the two units are positioned relative to each other before being rigidly fastened together, the desired exact orthogonal alignment between the flexure bars in the outer unit and the corresponding flexure bars in the inner unit may be facilitated by a simple visual inspection thereof. The flexure hinge assembly furthermore includes angle stop means for safely limiting the angular displacement of its hinge gimbals thereby preventing the delicate thin flexure bars from being overstressed or ruptured in operation.

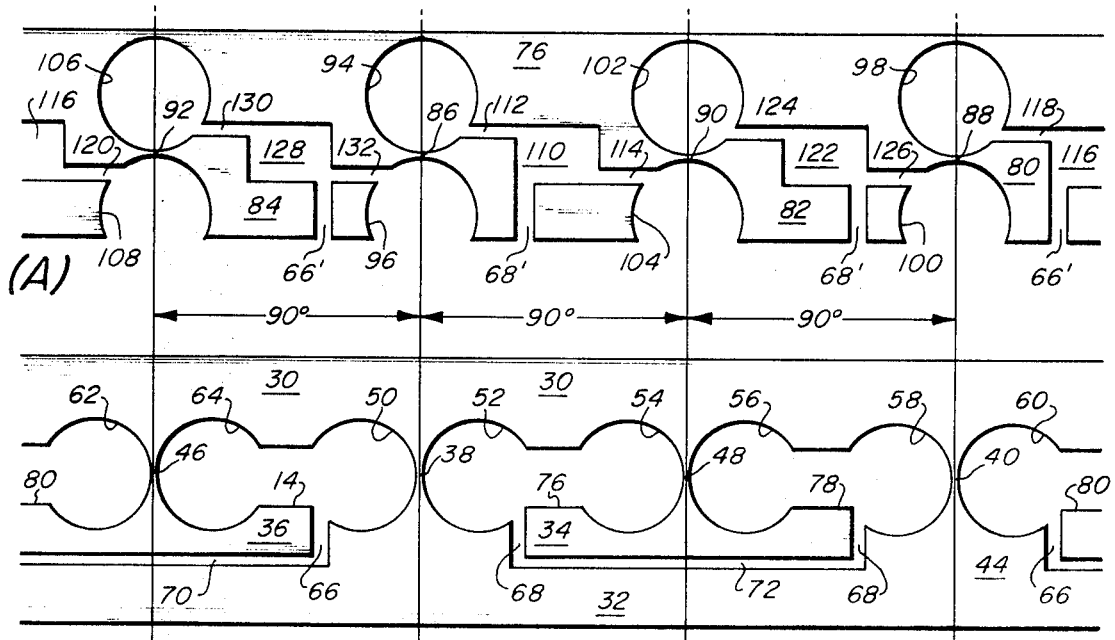
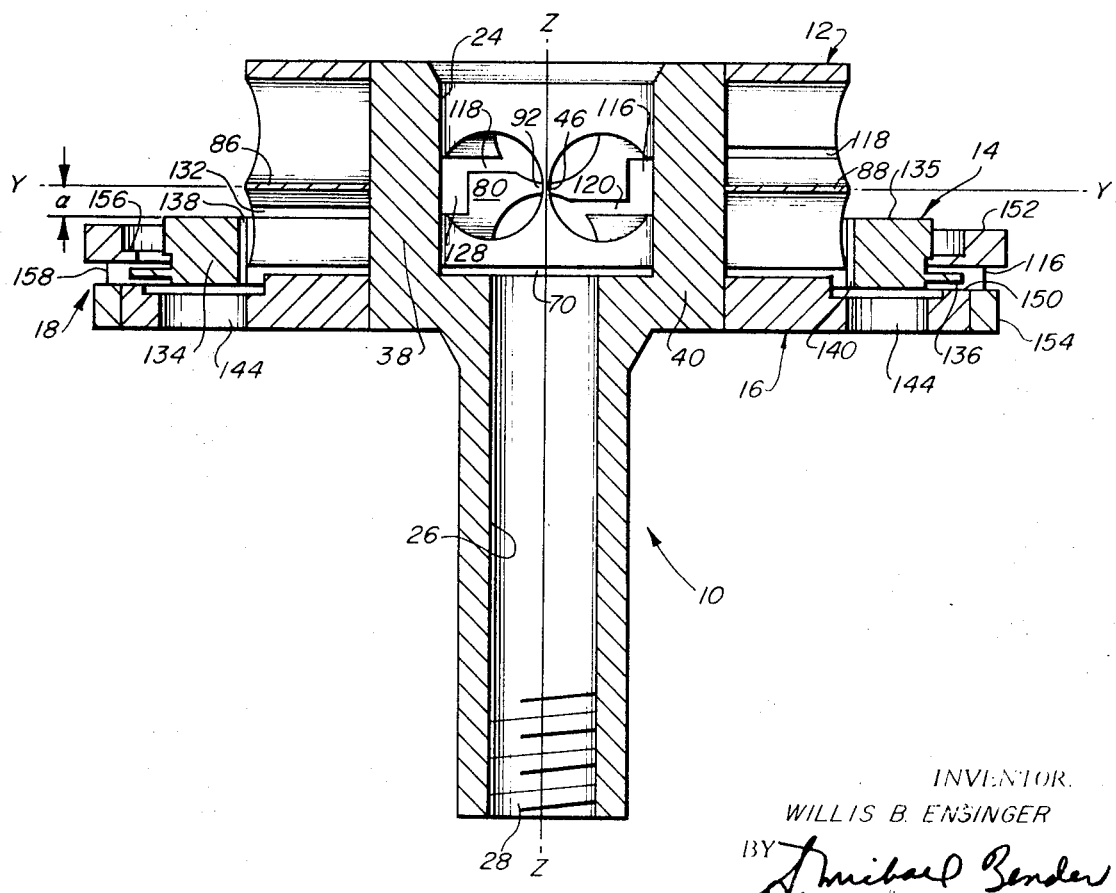

INVENTOR
WILLIS B. ENSINGER

BY J. Michael Bender
ATTORNEY

INVENTOR.
WILLIS B ENSINGER
BY
ATTORNEY

INVENTOR.
WILLIS B. ENSINGER
ATTORNEY

INVENTOR.
WILLIS B. ENSINGER

GYROSCOPE FLEXURE HINGE SUSPENSION

BRIEF SUMMARY OF THE INVENTION

The present invention relates generally to the art of gyroscopes and more particularly, to an improvement over the "Two-Axis Gyro" fully disclosed in U.S. Pat. No. 3,354,726 by W. J. Krupick and R. F. Cimera. The invention also relates generally to the following copending applications:

Ser. No. 761,148 entitled "Method and Means for Calibrating Spring Rate and Gimbal Unbalance in Free-Rotor Flexure-Suspended Gyroscopes" by G. Macor et al.;

Ser. No. 762,514 entitled "Universal Joint Flexure Hinge" by D. J. Bilinski et al.;

Ser. No. 795,302 entitled "Gyroscope Flexure Hinge Assembly" by W. B. Ensinger; and SER. No. 803,907 entitled "Stop Assembly for a Gyroscope" by D. J. Bilinski et al.

The patent, each of the copending applications, and the present invention are assigned to a common assignee.

The prior art gyroscope as exemplified by the Krupick et al. patent is a miniaturized, nonfloated, free-rotor displacement-type particularly adapted for stabilizing inertial platforms and the like, and features a unique frictionless, universal-joint flexure hinge or suspension for interconnecting the gyro's rotor or inertial flywheel to one end of a motor driven spin shaft. The hinge thus functions to impart positive rotation to the rotor from the shaft and, furthermore, permits simultaneous tilting or pivoting of the rotor about any transverse axis passing perpendicularly through the shaf's spin axis at the center of the hinge.

The prior art flexure hinge assembly actually comprises two units, an inner unit and an outer unit, nested one within the other in a generally concentric and parallel manner relative to the gyro spin or reference axis. In addition, each respective unit is composed of three gimbals—upper, middle, and lower—and has two quadrature pairs of oppositely disposed flexure bars or elements for interconnecting the gimbals and for permitting universal tilting between the upper gimbal and the lower gimbal. The reason tow hinge units are required is that the flexure elements, per se, consist of local thin sections of spring metal having substantial strength in only one direction, namely along the flexure bar's longitudinal axis and normal to its bending axis. Thus, the inner hinge has its flexure bars oriented in such a manner as to contribute high axial strength along the gyro's spin axis whereas the outer hinge has its flexure bars positioned so as to provide the necessary radial and torsional stiffness relative to the gyro's spin axis.

During assembly, the upper gimbals of the respective hinge units are fixedly coupled together and to the gyro's rotor while the lower gimbals of the two hinge units are fixedly connected to each other and to the gyro's spin shaft. It will thus be appreciated that when the two hinge units are employed together in this manner their respective characteristics complement one another to the extent that a unitary, universal-joint flexure hinge assembly is produced which has the required high degree of angular compliance and yet is extremely rigid against all lineal displacements both axially and radially with respect to the gyro's spin axis.

In the fabrication of the prior art flexure hinge, the thin flexure sections in each unit are formed by machining four equally spaced pairs of adjacently separated "blind" holes in the peripheral outside wall surface of a hollow cylindrical workpiece. The three gimbals are then formed by making appropriately shaped bolts or cuts in the wall of the cylinder thus freeing each gimbal for angular displacement about its respective flexure axis. The two hinge units which at this stage have freely displaceable gimbals are then assembled together as hereinaforesaid. One problem with this procedure is that great care must be taken to insure that the delicate thin flexure sections in each unit are not overstressed or ruptured during assembly since no limit stops are provided to restrict the angular displacement of the respective gimbals.

Another problem arises out of the requirement for maintaining the "spring rates" corresponding to the flexures in the inner unit substantially equal to those of the flexures in the outer unit. In order to accomplish this, the flexure sections in the outer unit must be exactly aligned in a juxtaposed manner with corresponding ones of those in the inner hinge unit so that the flexure axes defined by the extreme necked-down sections in each corresponding aligned juxtaposed pair are colinear. However, because the flexure elements in the prior art hinge are formed by "blind" holes, i.e., holes which are not drilled or bored completely through the wall of the cylinder, it is necessary to positioned the inner and outer hinge units by resorting to the use of external reference surfaces. In other words, the alignment between the corresponding sensitive thin sections cannot be directly viewed. As a result, slight misalignments between the flexure axis of the two hinge units frequently occur in production leading to the introduction of excessive and sometimes unsymmetrical spring rates in the finished gyroscope.

In addition, it has been found that in machining the "blind" flexure forming holes, the tip of the grinding quill has a tendency to wear at excessively high rates thus producing a taper at the bottom of each hole. This, in turn, results in the formation of flexures which do not have a uniformly constant thickness across their respective bending axes, leading to further anomalization in the gyro hinge assembly's spring rates.

Therefore, against this background, it is a primary object of the present invention to provide an improved gyroscope flexure hinge or suspension which may be fabricated in a simpler manner than the prior art hinges resulting in greater accuracy of finish and lower per unit cost.

It is another important object of the present invention to provide an improved gyro flexure hinge having means to facilitate the visual alignment between the corresponding flexure axes in the outer and inner hinge portions thereof.

It is yet another important object of the present invention to provide an improved gyro flexure hinge wherein the inner and outer hinge portions thereof are assembled together when they are in a rigid, unitary state and before they are fully gimballed.

It is still another important object of the present invention to provide an improved gyro flexure hinge assembly having integral angle stops means associated therewith to maintain the angular displacement of the hinge gimbals within prescribed safe limits after the gimbals have been freed.

To the accomplishment of these and other objects and advantages an improved flexure hinge design is disclosed below wherein the hinge unit portion which provides high axial strength relative to the gyro's spin axis is located or nested within the hinge unit portion contributing high radial and torsional strength relative to said spin axis as in the prior art flexure suspension. However, the holes machined in each hinge portion to form the flexure elements therein are machined through instead of being "blind." Consequently, when the two hinge portions are assembled together easy visual alignment between the corresponding flexure axes in each unit may be achieved. The hinge assembly of the present invention is furthermore provided with an angle stop flange on the rotor mounting rig for cooperation with an angle stop restraining ring integrally mounted on the portion of the hinge fixed to the gyro's motor spin shaft. The rotor mounting ring and angle stop ring are integrally fastened to the hinge assembly before the latter's gimbals are freed in bending. Hence, after gimballing of the gyro hinge assembly, the delicate thin flexure sections are maintained within safe prescribed limits of angular displacement thereby preventing the fracture or rupture of these parts during final assembly of the gyroscope.

Additional objects and advantages as well as a complete and thorough understanding of the present invention will be made apparent from a study of the following detailed description of the invention in connection with the accompanying drawings.

BRIEF DESCRIPTION OF THE DRAWINGS

FIG. 2 is an unwrapped view of the inner hinge unit's outside peripheral wall surface and of the outer hinge unit's inside peripheral wall surface, respectively;

FIG. 3 is a sectional view taken along line 3-3 of FIG. 5;

DETAILED DESCRIPTION OF THE INVENTION

Figure 4:
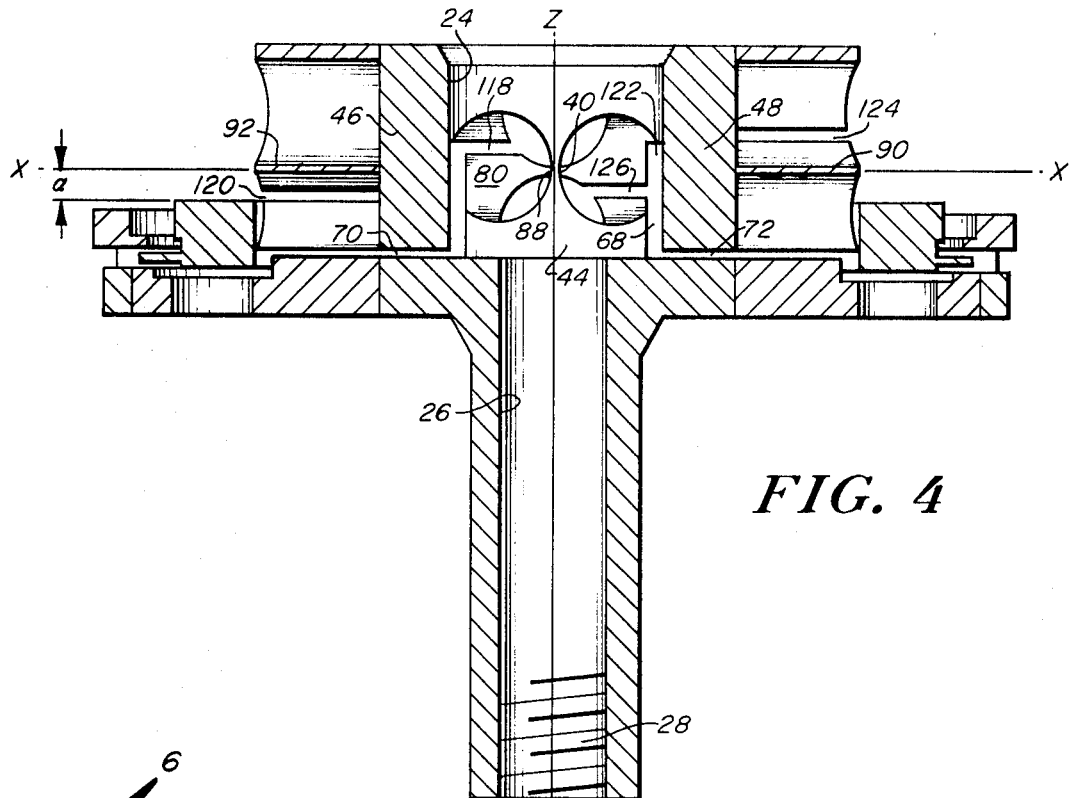
FIG. 4 is a sectional view taken along line 4-4 of FIG. 5.
Figure 5:
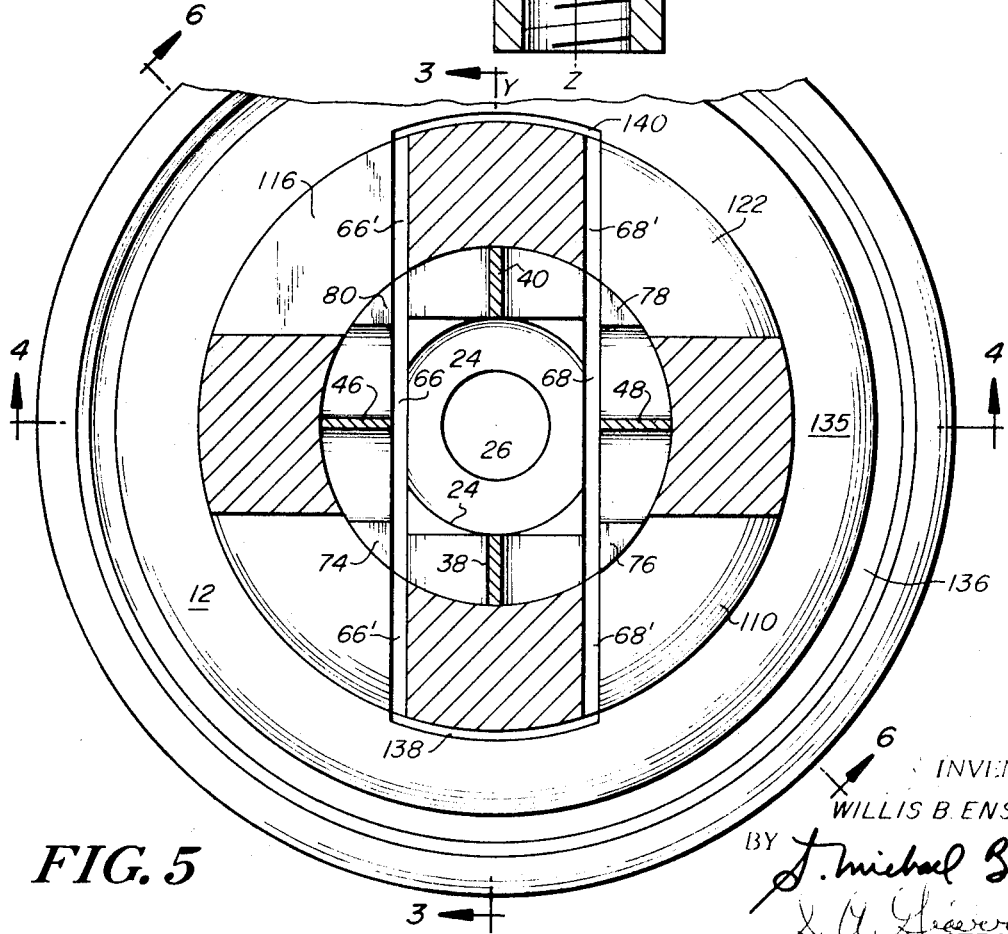
FIG. 5 is a sectional view taken along lines 5-5 in FIGS. 3 and 4, respectively.

Referring now to FIGS. 1 through 5, there is shown the flexure hinge suspension of the present invention including an inner hinge unit 10, an outer hinge unit 12, a rotor mounting ring 14, an angle stop ring 16 and an angle stop flange 18. Roughly speaking, each of these parts has a hollow, right-circular, cylindrical configuration and is coaxially related to a first principal axis indicated by the letter Z. Although the several elements of the assembly are shown axially separated in FIG. 1 for the sake of clarity, they are actually nested one within the other in a generally parallel and concentric manner and fixed in relative orientation substantially as shown in FIGS. 3 through 5. It will be understood that the terms "axial" and "radial" as applied herein to the present invention always relate to the Z axis unless stated otherwise. Furthermore, as will be made more apparent below the Z axis actually corresponds to the spin or reference axis of a gyroscope or the like and accordingly, the terms Z axis, spin or reference axis may be used interchangeably throughout the ensuing description.

Inner hinge unit 10 which comprises a two-axis, universal-joint flexure member as will be more fully explained elsewhere has an upper radially enlarged portion 20 and an integral lower elongate shaft portion 22. The enlarged upper portion 20 includes a central bore or recess 24 which communicates with a smaller bore 26 central to elongate shaft 22 at most clearly seen in FIGS. 3 and 4. The lower end of bore 26 is internally tapped to provide a threaded hole 28 for fixedly connecting the elongate shaft 20 to the output shaft of a gyroscope motor drive assembly through suitable screw fastener means or the like.

Figure 1:
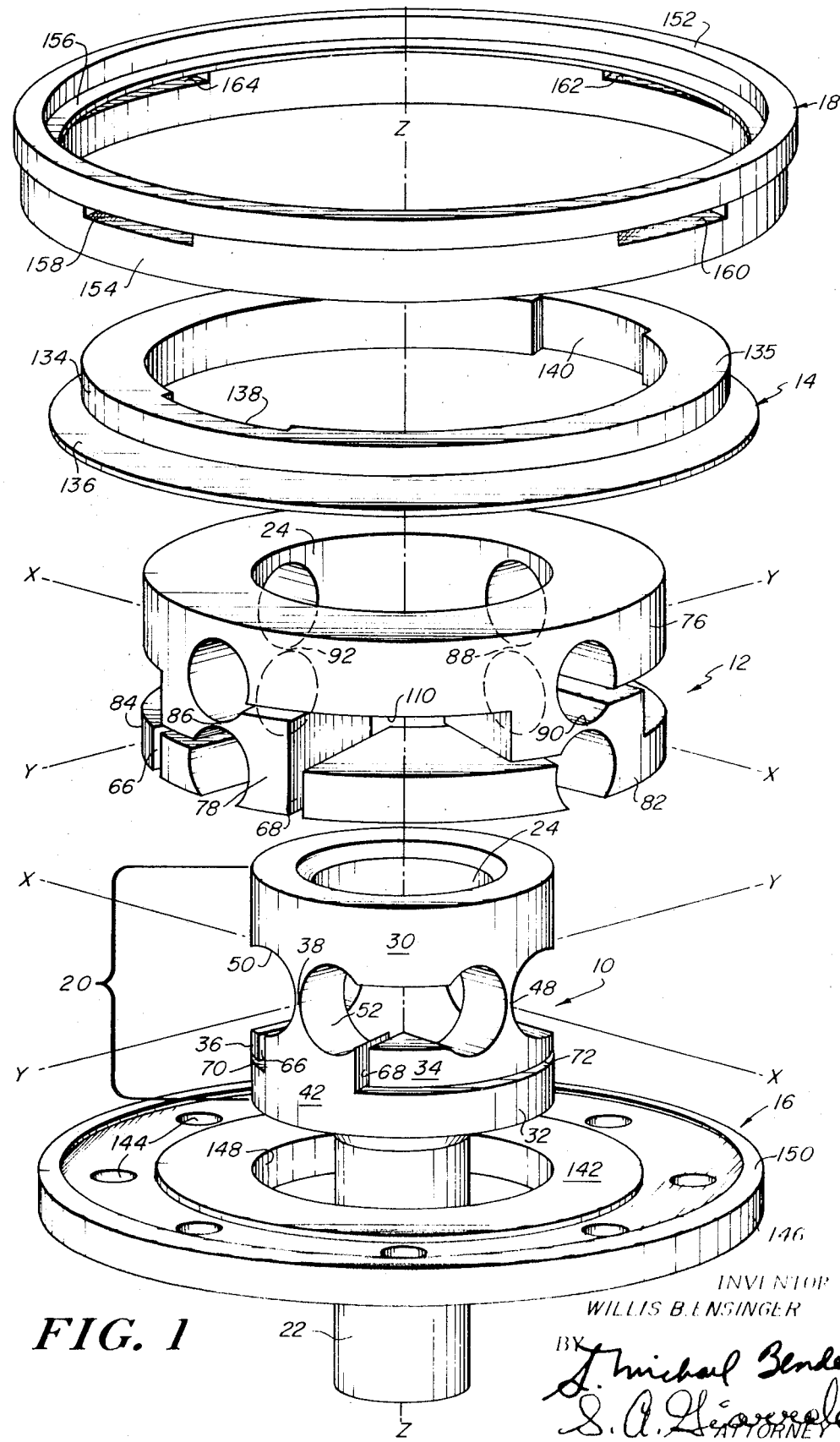
FIG. 1 is an exploded assembly showing in perspective in various component parts making up the flexure hinge assembly of the present invention.

With particular attention now directed to FIG. 1 and FIG. 2(B) which latter shows an unwrapped view of the outside peripheral surface of upper enlarged portion 20, inner hinge 10 includes an upper gimbal ring 30, a lower gimbal ring 32, and a pair of diametrically opposed, arcuately shaped middle gimbal portions 34 and 36. The middle gimbal portions are adapted to flex or bend relative to the lower gimbal ring a pair of principal axes, labeled X and Y respectively, which are in quadrature with each other and which are in common intersecting relation with the Z-axis, respectively. More specifically, upper gimbal ring 30 is adapted to pivot or tilt about the Y-axis through a first part of diametrically opposed necked-down flexure bars or elements 38 and 40 integral between upper gimbal ring 30 and a pair of diametrically opposed upstanding wall portions 42 and 44 which latter, in turn, are integral with lower gimbal ring 32. Similarly, middle gimbal portions 34 and 36 are permitted to tilt or pivot about the X-axis through a second pair of diametrically opposed necked-down flexure bars or elements 46 and 48 integral with the upper gimbal ring 30.

In accordance with an important feature of the present invention, the aforementioned gimbals and flexure bars are formed by machining a series of holes and slots in the cylindrical wall of upper enlarged portion 20. Thus, for example, flexure bar 38 is formed by boring and then finish grinding a pair of equal diameter, closely spaced, holes 50 and 52 completely through the wall of enlarged portion 20.

It will be noted that the holes are machined in parallel with one another, rather than radially with respect to the Z-axis. Stated otherwise, the centerlines of holes 50 and 52 are parallel to one another and to the Y-axis respectively. In addition, the centerlines of the two holes are precisely located in the X-Y plane so that the resulting thin necked-down wall portion remaining between holes 50 and 52 defines a flexure element having a bending axis coinciding with the Y-axis and having a longitudinal axis parallel to the Z-axis.

Flexure bar 40 which is diametrically opposed with respect to flexure bar 38, and flexure bars 46 and 48 which are diametrically opposed with respect to each other and in quadrature with flexure bars 38 and 40, respectively, are formed in an identically similar manner as by machining three additional pairs of closely spaced, parallel holes 58, 60; 54, 56 and 62, 64 completely through the cylindrical wall of upper enlarged portion 20. As shown, each of the flexure forming holes has the same diameter and each corresponding pair is spaced at 90° intervals around the circumference of the inner hinge unit thus producing an arrangement whereby flexure bars 38 and 40 have their bending axes aligned along the Y-axis, and flexure bars 46 and 48 have their bending axes aligned along the X-axis. Moreover, each flexure bar has a longitudinal axis parallel to the Z-axis.

In order to form the middle gimbal portions 34 and 36 which are integral respectively with flexure bars 46 and 48 and are therefore adapted for flexure about the X-axis relative to upper gimbal ring 30, a pair of straight parallel slots are first machined completely through the upper enlarged portion 20. These slots each of which have rectangularly shaped cross sections are indicated by reference numerals 66 and 68 and may be more clearly seen for example in FIG. 5, it being noted that he slots in question are axially spaced below the flexure hinge or X-Y plane and are parallel thereto as indicated for example in FIG. 2(B) and FIG. 4.

A pair of diametrically opposed, planar chordal slots 70 and 72 are then machined radially inward along the X-axis toward upstanding wall portions 42 and 44 until they intersect with the straight parallel slots 66 and 68 respectively as shown for example in FIG. 3. Finally, a series of slots are made through the wall of upper enlarged portion 20 substantially intermediately thereof to remove a rectangularly shaped interconnecting wall portion from between each pair of adjacent non-flexure-forming holes. Thus, a series of four rectangular slots 74, 76, 78, and 80 are formed through the inner hinge sidewall thereby connecting through holes 64 and 50, 52 and 54, 56 and 58, and 60 and 62, respectively as shown. These rectangularly shaped slots which are substantially symmetrical about the X-Y plane actually have a wedge or quadrant-shaped horizontal cross section as viewed in FIG. 5, due to the cylindrical form of the inner hinge unit.

It is thus seen that the flexure forming holes, the rectangular slots, the straight parallel spaced slots, and the planar chordal slots are so arranged as to effectively separate the middle gimbal portions 34 and 36 from the remainder of the inner hinge sidewall thereby permitting them to tilt or bend relative to the upper gimbal ring 30 about the X-axis through flexure bars 46 and 48.

Simultaneously, and for substantially the same reasons, upper gimbal ring 30 is freed for tilting about the Y-axis relative to the diametrically opposed upstanding wall portions 42 and 44 through flexure bars 38 and 40.

Outer unit hinge 12 which also comprises a two-axis, universal-joint member includes a central bore or recess 74 having a diameter substantially equal to the outside diameter of the inner hinge unit's upper enlarged portion 20. As will be more fully explained, this permits he two units to be telescoped together with the inner hinge being snuggly nested within the outer hinge as clearly shown, for example, in FIGS. 3 through 5. As in the inner hinge unit, outer hinge unit 12 includes an upper gimbal ring 76, a pair of diametrically opposed lower gimbal portions 78 and 80, and a pair of diametrically opposed middle gimbal portions 82 and 84 which latter are adapted to tile or pivot about the aforementioned X and Y axes relative to the lower gimbal portions 78 and 80 through a series of flexure bars or elements. That is, upper gimbal ring 76 is adapted to pivot or tilt about the Y-axis through a first pair of diametrically opposed flexure bars 86 and 88 integral between the ring 76 and the pair of lower gimbal portions 78 and 80 while the middle gimbal portions 82 and 84 are permitted to tilt or pivot about the X-axis relative to the upper gimbal ring through a second pair of diametrically opposed flexure bars 90 and 92 integral therewith.

Here again, each of the flexure bars 86 through 92 is formed by machining a corresponding pair of closely spaced parallel holes completely through the cylindrical wall of the outer hinge unit with the four pairs of holes being equiangularly spaced around the circumference of the hinge. For example, as shown in FIG. 2(A) which latter represents an unwrapped view of the inside cylindrical surface of the outer hinge unit, there is provided a first pair of holes 94, 96 for forming flexure bar 86; a second pair of holes 98, 100 forming flexure bar 88; a third pair of holes 102, 104 for forming flexure bar 90; and a fourth pair of holes 106, 108 for forming flexure bar 92. The centerlines of the holes in each pair are parallel to each other and to either the X-or Y-axis as the case may be so as to provide two pairs of diametrically opposed, spaced flexure bars having their flexure axes aligned along the X and Y axes, respectively. However, in direct contrast to the corresponding flexure forming holes in the inner hinge unit, holes 94 through 108 have their respective centerlines located in either the X-Z plane or the Y-Z plane. Because of this, when the inner and outer hinge units are assembled together each flexure bar in the outer hinge unit has a longitudinal axis orthogonally related to the longitudinal axis of a corresponding juxtaposed flexure bar in the inner hinge unit as clearly shown, for example in FIGS. 3 and 4.

As described about in connection with the inner hinge unit, it is necessary to remove portions of the cylindrical connecting wall from between the various flexure forming holes in order to free the middle gimbal portions 82, 84 for two-axis universal movement about the X and Y axes relative to lower gimbal portions 78, 80. Thus, a pair of straight, spaced parallel slots, having rectangular cross sections are machined completely through the outer hinge unit parallel to the Y-zxis and axially spaced below the X-Y plane. Since as shown in FIG. 5, these slots are actual extensions of slots 66, 68 formed in the inner hinge unit as previously described, they are indicated herein by the same reference numerals primed. It will be noted that these straight slots 66',68' define the lateral extent of lower gimbal portions 78, 80 and middle gimbal portions 82. 84.

A substantially rectangularly shaped slot having a pair of oppositely extending axially spaced extensions is then formed through the wall of the outer hinge unit between each pair of nonflexure-forming holes as best seen, for example in FIG. 2(A). Rectangular slot 110 which removes a portion of the connecting wall from between holes 94, 96 and 102, 104 has an upper extension 112 extending laterally into hole 94 and a lower extension 114 extending laterally and in the opposite direction from extension 112 into hole 104. As shown in FIG. 1, the axial extent of straight slot 68' is sufficient to intersect rectangular slot 110 so as to communicate directly therewith. With the foregoing arrangement of slots 110 and 68' and lateral extensions 112, 114 sufficient connecting wall material is removed from between holes 94, 96 and 102, 104 to enable the lower gimbal portion 78 to flex or bend about the Y-axis relative to the upper gimbal portion 76 through the agency of flexure bar 86.

In identically the same manner, rectangular slot 116 with its oppositely extending axially spaced lateral extensions 118, 120, and straight slot 66' combine to remove sufficient connecting wall material from between holes 98, 100 and 106, 108 so as to give lower gimbal portion 80 freedom of tilt about the Y-axis relative to upper gimbal ring 76 via flexure bar 88.

Similarly, rectangular slot 122 which has an upper lateral extension 124 projecting into hole 102 and an axially spaced oppositely extending lower extension 126 projecting into hole 100 combines with straight slot 68' to remove enough of the connecting wall from between holes 102, 104 and 98, 100 to enable the middle gimbal portion 82 to flex or bend about the X-axis relative to upper gimbal ring 76 through flexure bar 90 whereas rectangular slot 124, oppositely extending axially spaced lateral extensions 126, 128, and straight slot 66' are arranged together to remove sufficient connecting wall material from between holes 106, 108 and 94, 96 so as to give middle gimbal portion 84 freedom of tilt about the X-axis relative to upper portion gimbal ring 76 via flexure bar 92.

Although the vertical cross-sectional shape of each of the rectangular slots 110, 116, 122 and 128 is rectangular as viewed in FIG. 2 (A), it is to be remembered that each of these slots is machined completely through the cylindrical wall of the outer hinge unit. Therefore, the cross-sectional shape of each respective slot in the horizontal plane actually resembles a quadrant or wedge diverging radially inward toward the Z-axis as shown for example in FIG. 5.

It will be appreciated further that the oppositely extending lateral extensions common to each respective rectangular slot are substantially in quadrature with each other as indicated, for example, by slot extensions 118 and 120 in FIG. 3 and 4; and that the rectangular slots 74 through 80 in the wall of the upper enlarged portion of the inner hinge are in registry respectively with the corresponding rectangular slots 110, 116, 122, 128 in the outer hinge unit when the two units are telescoped together as shown in FIGS. 3 through 5.

Referring now to the rotor mounting ring 14, this component comprises essentially a central hub portion 134 and an outwardly radially extending relatively thin flange portion 136. The axially upper surface of hub portion 134 includes an axially upper surface 135 which is adapted to fixedly support a gyroscope rotor or inertial flywheel as by cementing the latter thereto, for example, in a manner well-known in the art. The inside peripheral surface of hub 134 is cut away at two places to form a pair of diametrically opposed axially extending standoff recesses 138 and 140 which are substantially parallel to both the Z-axis and the X-axis and which are normal to and bisected by the Y-axis. Thus, when the rotor mounting ring is arranged relative to the outside peripheral surface of the outer hinge unit as shown in FIGS. 3 through 5, recesses 138, 140 will lie in juxtaposed relation to lower gimbal portions 78 and 80 so that the recessed inside peripheral wall surfaces of the rotor mounting ring are radially spaced therefrom respectively.

Angle stop ring 16 includes a hub portion 142, an integral center web member 134 and an outer rim portion 146. The hub portion 142 has a central bore or recess 148 substantially equal in diameter to the of lower ring gimbal 32 of the inner hinge unit 10 so as to permit the flange to be snuggly fitted over the lower ring gimbal 32 in a generally telescoping manner as shown to best advantage in FIGS. 3 and 4. Thus, when the flange 16 is so arranged, the hub portion 142 is axially spaced below the outer hinge 12, the center web member is axially spaced below the rotor mounting ring 134, and the upper axial surface 150 of rim portion 146 partially underlies the extreme radially extending portion of rotor mounting ring flange 136 around the entire circumference of the flexure hinge assembly.

Finally, with reference to the angle stop flange 18, the latter includes an upper lip portion 152, an integral downwardly extending cylindrical wall or skirt portion 154 and an integral radially inwardly projecting flange member 156. The skirt or wall 154 is machined through at four locations to provide a series of rectangular holes or slots 158, 160, 162, and 164 equiangularly spaced around the circumference thereof, The function of these slots will be made more obvious below. The inside diameter of cylindrical skirt portion 154 is sized to fit snuggly over the outside diameter corresponding to the outer rim portion 146 of angle stop ring 16 as shown in FIGS. 3 and 4. When in this position the slots 158 through 164 are spaced circumferentially and radially opposite the rotor mounting flange 136 as shown. In addition, the axially lower surfaces of the flange 18 and the ring 16 are coplanar, and the radially inwardly projecting flange member 156 partially overlies the rotor mounting ring flange 136 around the entire cylindrical periphery of the hinge assembly. It will be appreciated that the axial distance between the lower surface of flange member 156 and upper surface 150 of angle stop ring rim portion 146 is sufficient to provide a clearance space above and below the rotor mounting flange 136 which clearance space defines the limits of angular displacement or tilt for the flexure hinge assembly of the present invention as will be described in more detail below.

ASSEMBLY

In accordance with an important feature of the present invention, the various subassemblies shown in FIG. 1 are brought together and fastened relative to each other in a preferred manner and in a preferred sequence as will now be presently described. As already mentioned, outer hinge unit 12 is telescoped over inner hinge unit 10 so that the two units fit snuggly together and are substantially parallel to each other and coaxial to the Z-axis respectively. Moreover, it is extremely important that the relative angular orientation between the two units be carefully and accurately adjusted so that the X and Y axes corresponding to each unit will be made coincidental to each other respectively. If it is assumed that the parts are machined to near perfect tolerances and that the relative positioning thereof may be made with equal precision the following will obtain:

1. each flexure bar in the outer hinge unit will have its longitudinal axis aligned normal to the longitudinal axis of a corresponding juxtaposed flexure bar in the inner hinge unit,
2. each corresponding pair of juxtaposed flexure bars will have a common flexure axis,
3. each of the two quadrature sets of diametrically opposed pairs of corresponding juxtaposed flexure bars will have a common flexure axis, and
4. each of the aforementioned common flexure bar axes will lie in the X-Y plane.

As contemplated by the present invention, various means are provided and a novel assembly method is disclosed wherein the above mentioned desideratum may be substantially achieved in actual production. For example, as mentioned previously, the flexure bars in each hinge unit are formed by machining separate pairs of equal diameter, closely spaced holes completely through the peripheral cylindrical sidewall of each hinge unit, respectively. This enables each and every flexure bar to have substantially the same uniform thinness dimension across its extreme necked-down section thus precisely locating its flexure axis, and furthermore providing a series of flexure bars having the same spring rate constant. In prior art flexure hinge assemblies, the flexure forming holes are not drilled through, rather they are formed by machining a series of "blind" holes in each hinge unit's sidewall. Because of this, the tip of the grinding tool forming the "blind" holes tends to taper at the bottom of the hole thereby producing a flexure bar having a nonuniform thinness dimension across its extreme necked-down section and a series of flexure bars having unequal and nonuniform spring rates.

Another important advantage achieved with the throughhole construction of the present invention resides in the ability to visually inspect the orthogonal alignment between each pair of corresponding juxtaposed flexure bars since these alignments are now rendered clearly visible as seen, for example, to good advantage in FIGS. 3 and 4. Thus, with the aid of suitable optical instrumentation, a precise relative positioning adjustment between hinge units 10 and 12 may be easily accomplished prior to permanently joining these two units together as will now be explained.

In accordance with still another important feature of the present invention, the inner and outer hinge units are immediately and permanently joined together in a fixed and rigid manner subsequent to the machining of holes 50 through 64 (inner hinge unit) and holes 94 through 108 (outer hinge unit). Then, and only then, are straight through slots 66, 68, 66', and 68', and the chordal planar slots 70 and 72 machined in the integral unitary workpiece as will be subsequently explained.

At present therefore, let it be assumed that the two hinge units have been accurately positioned relative to each other so that the corresponding flexure bars are aligned as depicted in FIGS. 3 through 5. The inner hinge and outer hinge units are finally and permanently joined preferably by precision welding their abutting circumferential surfaces together with an electronic beam welder, for example.

Briefly speaking, the art of electronic beam welding which has become fairly well known and used in recent years, involves the application of a high energy beam of electrons focused onto the work piece surfaces being joined, usually in a high vacuum environment. The kinetic energy of the electrons as they impinge upon the workpiece material is converted into a well defined, narrow region of intense heat which fuses the two surfaces together producing the weld. By simply varying the focusing and the power of the beam the weld dimensions, although relatively quite small, may be extremely well controlled resulting in the production of a welded joint that is precisely located and has high uniform strength. And, although electronic beam welding is preferred herein by way of illustration, it will be obvious to those skilled in the art that various other known methods may be used instead to join the several components of the flexure hinge assembly together without departing from the scope of the invention.

Figure 6A:
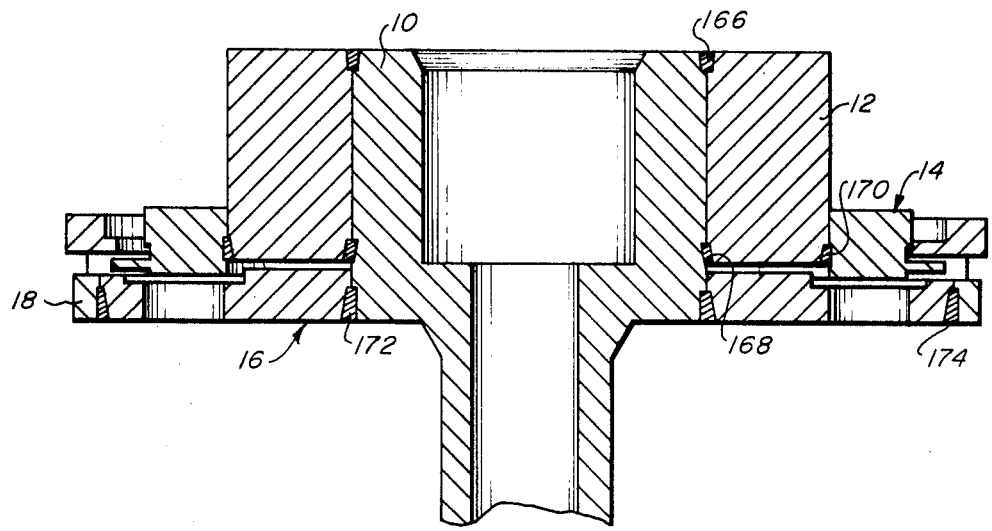
FIG. 6 illustrates the various welds used in joining together the subparts of the flexure hinge assembly.
Figure 6B:
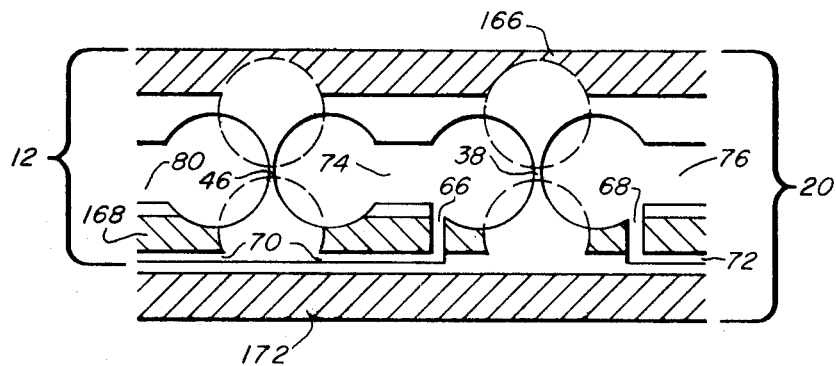
Figure 6C:
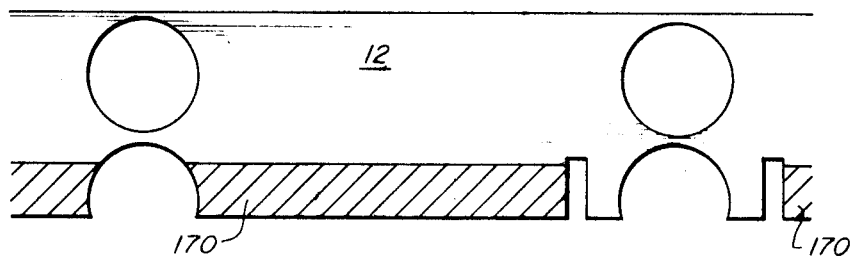

Turning now to FIG. 6 (A) it will be noted that the inner and outer hinge units are permanently joined together with a pair of axially separated welds namely, an upper weld 166 and a lower weld 168. As indicated in FIG. 6 (B), which latter comprises an unwrapped view of a portion of the outer peripheral surface of the inner hinge unit, the upper weld 166 whose axial dimension or depth is represented by the shaded area, extends completely around the circumference of the inner and outer hinge interface and therefore has the effect of rigidly joining the upper ring gimbals 30 and 76 together thereby forming a single integral upper gimbal.

In similar fashion, lower weld 168 extends 360° around the periphery of the inner and outer hinge interface and has an axial depth or extent which, as will be made more apparent below, is sufficient to permanently and rigidly join together the inside peripheral surfaces of middle gimbal portions 82 and 84 (outer hinge unit 12) and the outside peripheral surfaces of middle gimbal portions 34 and 36 (inner hinge unit 10), and to join the inside peripheral surfaces of lower gimbals 78 and 80 (outer hinge unit) to the outside peripheral surfaces of upstanding wall portions 42 and 44 (inner hinge unit). Of course, when lower weld 168 is being made, slots 74 through 80; straight through slots 66, 68; planar chordal slots 70 and 72, etc., have not yet been machined in the workpiece, and accordingly, the aforementioned middle gimbal portions, upstanding wall portions, etc., will not be in evidence. In spite of this, the slots have been represented in FIG. 6 (B) so as to enable the reader to more easily appreciate the relationship obtaining between the area of weld 168 and the operative parts of the flexure hinge assembly when the latter is completed as this is deemed important for a full and complete understanding of the present invention.

Thus, after completing welds 166 and 168 the resulting unitary, structurally rigid workpiece comprising hinge units 10 and 12, still has only the flexure forming holes formed therein and is now ready for the first of the slot machining operations all of which when completed will eventually form the various hinge gimbals necessary to permit the flexure assembly freedom of bending about the X and Y axes respectively.

Since the flexure hinge assembly of the present invention may be of relatively small overall size, (e.g., in one application it is intended that the rotor mounting ring 14 have an outside diameter on the order of approximately 0.75 inches) and furthermore, since the shapes of the aforementioned gimbal forming slots are somewhat intricate, it is preferred that an extremely accurate and well controllable slot machining process be employed such as, for example, electrical discharge machining or EDM as it is more simply referred to in the art.

Briefly described, electrical discharge machining relates to the controlled removal of the material from an electrically conductive workpiece by gradually melting or vaporizing the material with a high frequency electrical spark discharge between the workpiece and tool or electrode. The spark discharge is produced by pulsing a direct current between the workpiece which is usually positively charged and the electrode which is usually negatively charged. This requires that the electrode and the workpiece be always separated by a spark gap which may be as small as, say, 0.0001 inches, for example, while both are immersed in or flooded by a dielectric fluid medium. The dielectric in the gap is partially ionized under the pulsed application of a high voltage and thus enables the spark to discharge across the gap between tool and workpiece whereupon each spark produces enough heat to melt or vaporize a small quantity of the workpiece, leaving a microscopic pit or crater in the surface of the work.

Figure 7A:
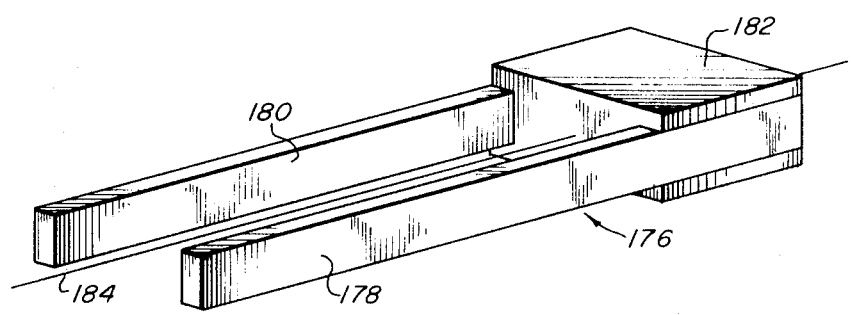
FIG. 7 shows a pair of electrode tools used in machining the flexure hinge assembly.
Figure 7B:
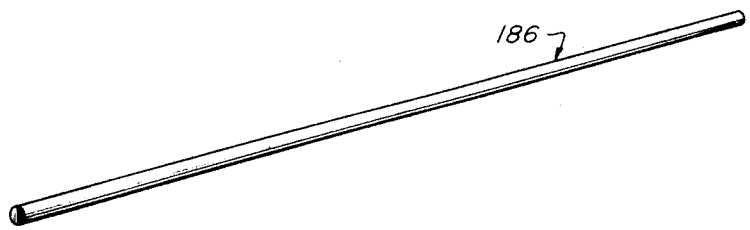
Figure 8:
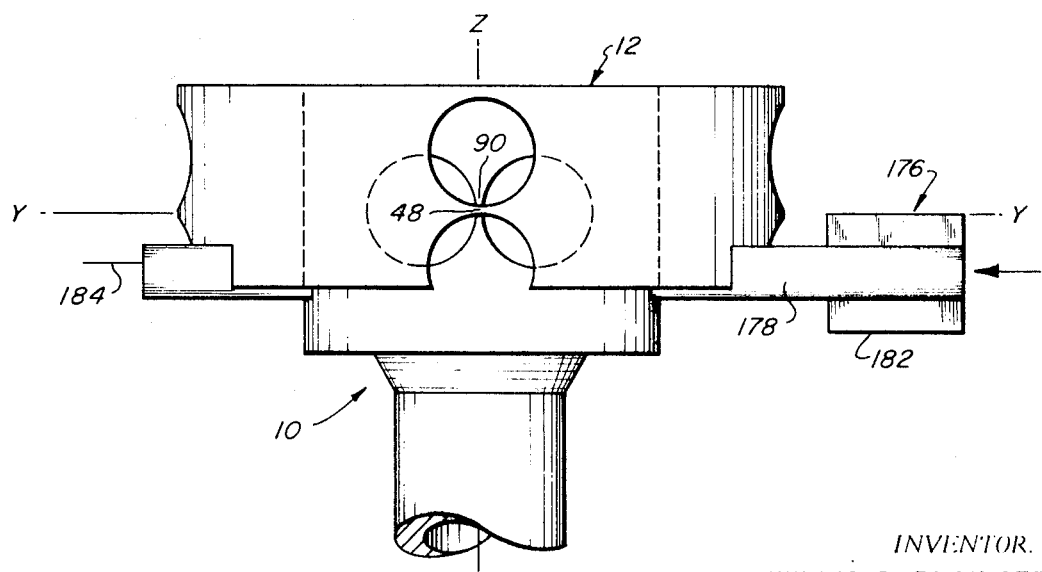
FIGS. 8 and 9 illustrate two of the machining operations employed in accordance with the present invention.

In addition to its high accuracy and the absence of physical contact between tool and workpiece, EDM has the further advantage of being able to make odd shapes or complex cuts by simply having the electrode conform to the mirror image of the shape of cut desired. Thus, for example, in forming the pair of spaced parallel rectangular slots 66, 66' and 68, 68' in the integral workpiece, a tool or electrode 176 is provided as shown in FIG. 7 (A). This tool, in its preferred form essentially comprises a pair of spaced straight parallel electrodes 178, 180 integrally fastened to a rectangular block member 180 for supporting the electrodes in a suitable toolholder or chuck. The electrodes have identically sized rectangular cross sections, which are roughly equal respectively to the cross-sectional rectangular dimensions of slots 66 and 68. That is, the dimensions of the electrodes 178, 180 are actually undersized by the dimensions of the spark gap being employed. In the operation of the conventional EDM setup or machine, the electrodes, whatever particular shape they may have, are usually hydraulically advanced into the workpiece under servocontrol with the servo getting its input signal from the difference between a selected reference voltage and the actual voltage across the gap so as to maintain the spark gap constant. A servo driven hydraulically advanced toolholder (not shown) is initially positioned relative to the integral workpiece so that the longitudinal axis 184 of tool 176 is parallel to and spaced slots below the Y-axis by an amount sufficient to enable the lower edges of electrodes 178, 180 to extend slightly below the lower axial end surface of the outer hinge unit 12. Then, as shown in FIG. 8, the electrode tool 176 is advanced to the left along the direction of arrow 186 (i.e., parallel to the Y-axis) until the free ends of electrodes 178 and 180 extend completely through the integral workpiece. Having thus formed straight parallel rectangular slots 66, 66', 68, 68', (see FIG. 5), the tool is then completely withdrawn from the workpiece.

Figure 9:
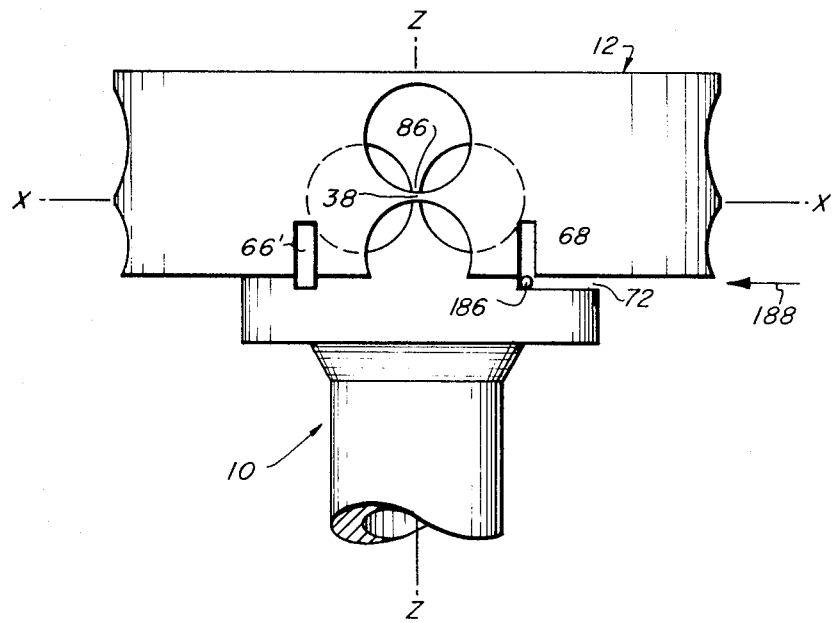

In the next machining operation, the planar chordal slots 70 and 72 are formed in the integral workpiece comprising hinge units 10 and 12. These relatively simple straight slots are preferably machined with an electrode tool 186 which latter may comprise merely an elongate straight wire or round bar as shown in FIG. 7 (B), said bar having a diameter equal to the slot dimension again undersized by the electrode gap spacing. Turning to FIG. 9, the electrode 186 is positioned with its longitudinal axis parallel to the Y axis and is then advanced into the workpiece in the direction indicated by arrow 188, that is, parallel to the X-axis, until slot 72 formed thereby communicates with the bottom most portion of straight slot 68. The electrode is then withdrawn, the workpiece indexed 180° about its Z-axis whereby planar chordal slot 70 is subsequently machined in similar fashion.

As soon as the slots 70 and 72 have been machined in the integral workpiece, the remaining subassemblies including rotor mounting ring 14 angle stop ring 16, and angle stop flange 18 may be permanently joined thereto.

First, the angle stop ring 14 is snuggly fitted in a telescoping manner over the outside peripheral surface of the outer hinge unit whereby its upper, axial, rotor mounting surface 135 extends parallel to and below the X-Y plane by an amount indicated by the Greek letter alpha in FIGS. 3 and 4. In addition, the ring 14 is carefully and accurately angularly positioned relative to the outer hinge unit so that the standoff recesses 138 and 140 are in perfect registry with the outer hinge unit's lower gimbal portions 78 and 80 (see FIG. 5). The rotor mounting ring 14 is then permanently joined to the outer hinge unit 12 by electronic beam welding along their common abutting surfaces. This will produce the circumferential weld 170 as shown in FIG. 6 parts (A) and (C). Note that because of the relationship between the standoff recesses 138 and 140 on the one hand and the lower gimbal portions 78 and 80 on the other, the weld 170 actually joins the rotor mounting ring to only those portions of the outer hinge unit which will essentially comprise the middle gimbal portions 82 and 84. As explained in more detail below this construction will allow the rotor mounting ring to freely tilt or bend relative to integral upper gimbal ring 30, 76 about the Y-axis. Nonetheless, after rotor mounting ring 14 has been permanently joined to the outer hinge unit via weld 170, the integral workpiece still comprises a structurally rigid, unitary member and will remain so until the final gimbal forming EDM cuts are made as will be subsequently explained.

Figure 10:
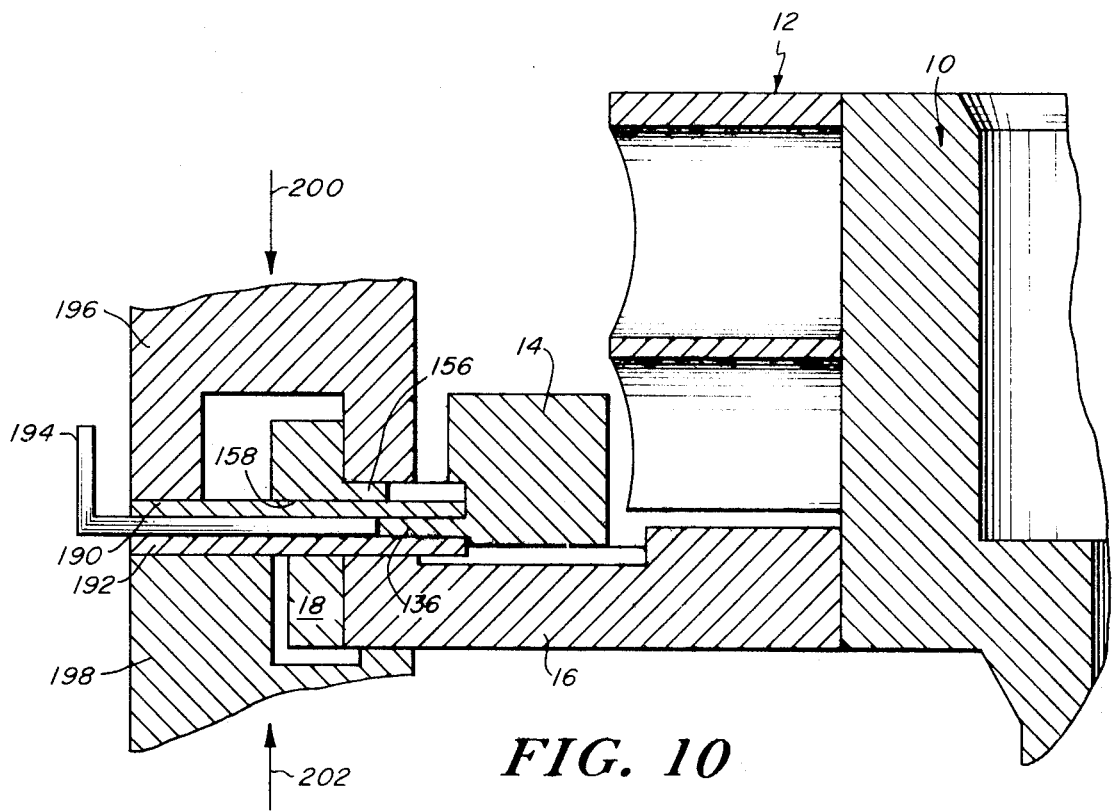
FIG. 10 is an enlarged detail of FIG. 3.

The angle stop ring 16 and the angle stop flange 18 are next permanently joined to the rigid, integral workpiece the latter now comprising hinge units 10, 12 and rotor mounting ring 14. As indicated in FIG. 6, the angle stop ring 16 is telescoped over the inner hinge unit's lower gimbal ring 32 and rigidly fastened thereto with an electronic beam weld 172 while the angle stop flange 18 is telescoped over the angle stop ring's outside peripheral surface 146 and likewise joined thereto with an electronic beam weld 174. However, before the angle stop ring and the angle stop flange may be welded to the integral workpiece and to each other respectively, it is first necessary to accurately and precisely adjust their relative positions so that the upper clearance space between the rotor mounting ring flange 136 and the angle stop flange 156 and the lower clearance space between the flange 136 and the upper surface 150 of the angle stop rin's outer end portion 146, are accurately and uniformly maintained around the entire circumference of the flexure hinge assembly. This requirement may be met in accordance with the present invention by utilizing the preferred angle stop adjusting apparatus illustrated in FIG. 10.

After setting up the integral workpiece (hinges 10, 12 and rotor mounting ring 14) in a suitable fixture means, rather than immediately welding the angle stop ring 16 and angle stop flange 18 as hereinbefore described, the latter two parts are instead merely snuggly fitted relative to each other and coarsely adjusted to assume their final positions on the integral workpiece in a generally nominal manner. A series of shims is then inserted radially inwardly through each of the four holes 158 through 164 in skirt 154 of angle stop flange 18. That is, upper shim 190 which has a thickness equal to the intended clearance space between flange 136 and flange 156 is inserted therebetween until its radially inner end substantially abuts up against the outside peripheral surface of the rotor mounting ring. In similar fashion, lower shim 192 which has a thickness equal to that of shim 190 and to the intended clearance spaced between flange 136 and upper surface 150 is inserted therebetween until its radially inner end also abuts up against the outside peripheral surface of the rotor mounting ring as illustrated, for example, in connection with slot 158 of angle stop flange 18. The two shims 190 and 192 are separated by an L-shaped central spacer member 194 which has a thickness equal to that of flange 136 and which is inserted between the shims until contact is made with the outside peripheral surface of flange 136. When the two shims and the central spacer member are in place as shown the upper and lower jaws 196 and 198 of a suitably adapted clamp means (not shown) are then brought together and tightened as indicated by arrows 200 and 202. Upper jaw 196 includes a first radially outer projection which engages upper shim 190 and a second radially inner projection which engages the upper axial surface of flange 156. On the other hand, lower jaw 198 includes a first radially outer projection for engaging lower shim 192 and a second radially inner projection for engaging the axially lower surface of angle stop ring 16. Since, flange 136 of the rotor mounting ring has already been finally welded to the integral workpiece structure, tightening of jaws 196 and 198 in the direction of arrows 200 and 202 will have the effect of urging the angle stop ring and the angle stop flange relative to each other whereby they will respectively assume an exact final position dictated by the thickness dimension of the shims 190 and 192 and of the central spacer member 194. The ring 16 and the flange 18 will remain fixed in their newly adjusted position as long as the clamp means is maintained in a tightened condition. It will be appreciated therefore that when a series of four clamps is used each one identical to that shown in FIG. 10 and each one equiangularly spaced around the circumference of the flexure hinge assembly, (i.e., at the location of each of the slots 158, 160), the angle stop ring and the angle stop flange may be extremely accurately positioned relative to each other and to flange 136 thereby precisely determining in a quick and efficient manner and the angle stop clearance spaces required by the present invention. Welds 172 and 174 are then simultaneously completed as hereinbefore described in connection with FIG. 6 and the clamps and the shims subsequently removed.

At this juncture, the flexure hinge assembly will have all of its subparts permanently joined together, but will still be in rigid and unitary form. All that remains to complete the assembly, therefore is the machining of the final EDM cuts in the integral workpiece to form the various gimbals and free the flexure hinge for angular displacement about the X and Y axis.

Figure 11:
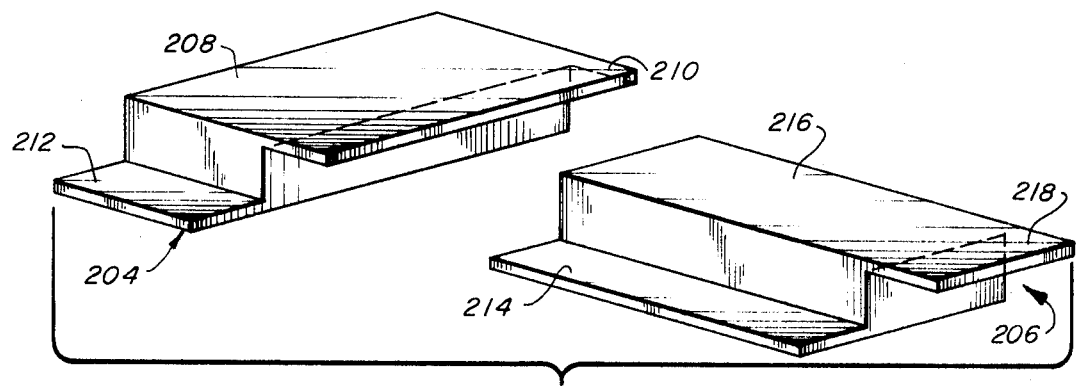
FIG. 11 shows another pair of electrode tools used in machining the flexure hinge assembly.

This is accomplished in a preferred manner by employing the two EDM electrode tools 204 and 206 as shown in FIG. 11. Electrode 204 includes rectangular main body portion 208, a first laterally extending thin rectangular lip 210 forming an extension of the upper surface of the rectangular main body portion, and a second longitudinally extending thin rectangular lip 212 forming an extension of the lower surface of the rectangular body portion. Electrode 206 is exactly identical to electrode 204, but is rotated 180° about its longitudinal axis. Hence electrode 206 has a first thin rectangular lip 214 extending laterally from the lower surface of the rectangular main body portion 216 thereof, a second thin rectangular lip 218 extending longitudinally from the upper surface of the rectangular main body portion thereof.

The two electrodes 204, 206 are arranged parallel and coplanar with respect to each other and are symmetrically positioned about the X-axis and the X-Y plane, respectively, relative to the integral workpiece. They are then preferably advanced simultaneously into the workpiece along the direction parallel to the X-axis as indicated in FIG. 12, for example, by arrow 220.

As the electrode tools 204 and 206 advance into the workpiece various ones of the gimbal forming slots are machined simultaneously. For example, consider the effect of electrode 204. As this tool progresses along the direction of arrow 220 its longitudinally extending lip portion 212 will form laterally extending slot 126, its laterally extending lip portion 210 will machine the laterally extending slot 124, and its rectangular main body portion 208 will form the rectangular slots 122 and 78 (see FIG. 2).

Figure 12:
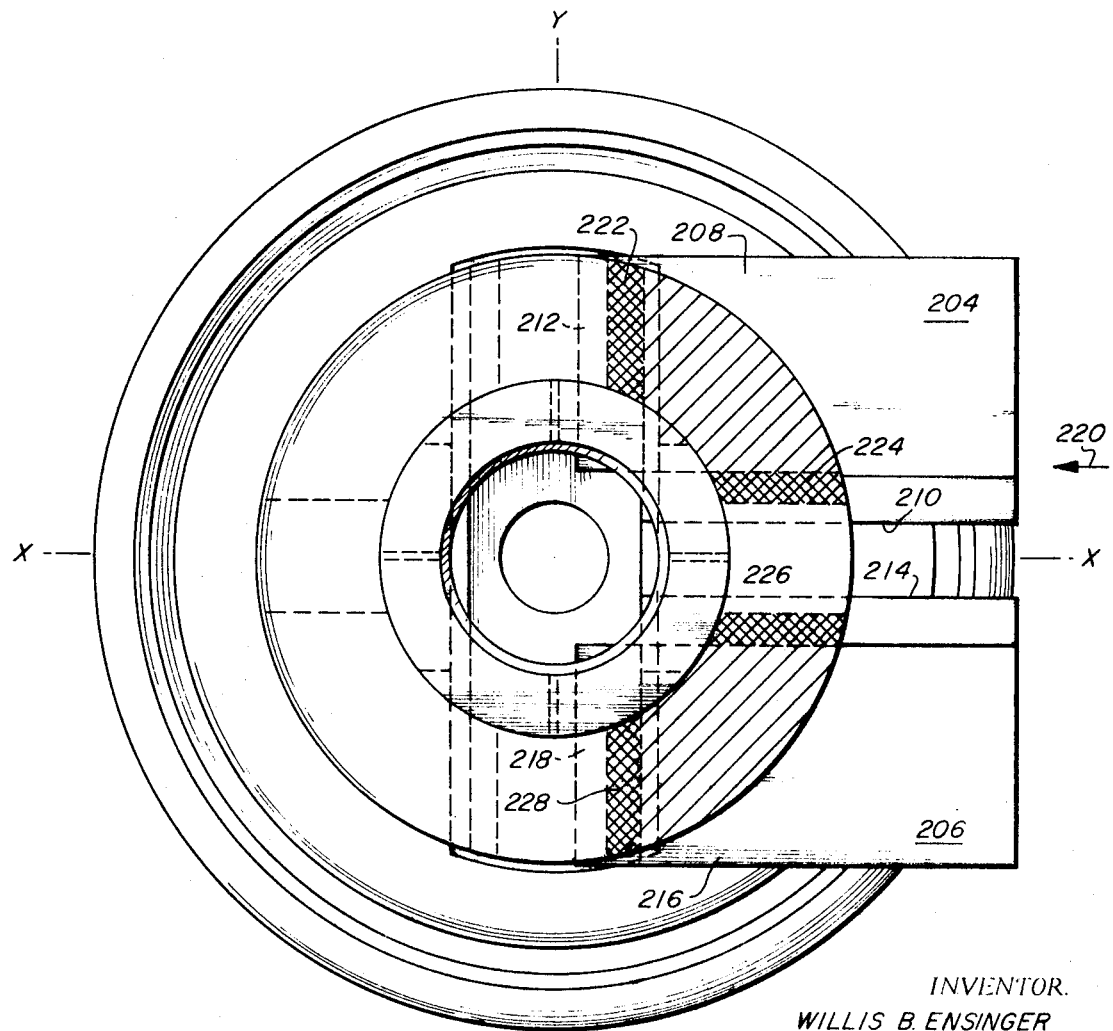
FIG. 12 shows the electrode tools of FIG. 11 as used to machine the flexure hinge assembly of the present invention.

As seen in FIG. 12, the rectangular slots 122 and 78 actually converge toward the Z-axis because of the integral workpiece cylindrical shape and therefore have a common wedge shaped horizontal cross section as indicated by the shaded area 211. Despite such convergence, the vertical cross-sectional shape corresponding to these slots remains essentially rectangular as viewed in FIG. 2, with slot 78 being an extension of slot 122 and in perfect registry therewith. The crosshatched areas crosshatched and 224 in FIG. 12, represent the material removed from the outer hinge unit 12 by the action of the electrode lip portions 210 and 212 forming slots 124 and 126 respectively, and clearly show that these slots are actually in quadrature with one another due to the aforementioned cylindrical shape of the outer hinge unit.

In similar fashion, as electrode tool 206 is advanced to the position shown in FIG. 12, its laterally extending lip portion will form lateral slot extension 114, its longitudinally extending lip portion 218 will form lateral slot extension 112, and its rectangular main body portion will machine out the rectangular slots 110 and 76. Here again, the horizontal cross sections of material removed from the hinge assembly are represented by the shaded area 213 (rectangular slots 110, 76) and the crosshatched areas 226 and 228 which latter represent the material removed to form lateral slot extensions 114 and 112. It is thus seen, that by advancing electrode tools 204 and 206 into the workpiece simultaneously exactly half the required number of gimbal forming lots may be formed in a single machining operation. Obviously, in order to machine the remaining gimbal forming slots, all that is required is to withdraw the tools 204 and 206 from the workpiece, index the latter 180° about its Z-axis, and once more advance the electrodes into the workpiece until they reach the position shown in FIG. 12 thereby forming the rectangular slots 116, 80, 128, 74, and lateral slot extensions 118, 120, 130, 132 in exactly the same manner described above. The electrodes 204 and 206 are then withdrawn from the workpiece and the assembly of flexure hinge suspension of the present invention is completed.

Briefly recapitulating the novel assembly method of the present invention, the inner and outer hinges 10 and 12 which have only their flexure forming holes 50 through 64 and 94 through 108 machined therein respectively, are first accurately positioned relative to one another so that their X and Y axes are coincident respectively and each flexure bar in the outer unit lines up orthogonally with respect to a corresponding juxtaposed flexure bar in the inner unit. This may be done most exactly because the through-hole construction of the flexure bars permits direct viewing of the cross axis arrangement between each pair of corresponding juxtaposed flexure bars. The inner and outer units are then permanently joined together to form a rigid and unitary structure by a pair of circumferential, axially displaced upper and lower welds 166 and 168. At this point, the integral structure is machined to form therein straight slots 66, 68, 66', 68' and a pair of diametrically opposed chordal planar slots 70 and 72. The rotor mounting ring 14 is then accurately positioned relative to the outer hinge unit so that its rotor mounting surfaces is parallel to and displaced axially below the X-Y plane. Thereupon, ring 14 is joined to the outer hinge unit by circumferential weld 170. Angle stop ring 16 and angle stop flange 18 are then respectively accurately positioned relative to the rotor mounting ring flange 136 and welded to each other and to the inner hinge unit's lower gimbal ring 32 respectively, via welds 174 and 172. Finally, the series of gimbal forming slots 110 through 132 and 74 through 80 are machined in the unitary assembly to free the flexure hinge for two-axis displacement about the X and Y axes.

OPERATION OF THE FLEXURE HINGE ASSEMBLY

Generally speaking, the flexure hinge assembly of the present invention is intended to serve as a connective and supportive link between a gyroscope's inertial flywheel or rotor and its motor drive assembly. Hence, in operation, the gyromotor drive output shaft is directly coupled to the flexure hinge's lower shaft extension 22 causing the entire assembly to rotate about the Z-axis and thereby transferring angular momentum to the flywheel since the latter is mounted on the rotor mounting ring's surface 135 coaxial to the Z-axis. A gyroscopic inertial flywheel and motor drive assembly suitable for use with the present invention are fully disclosed in the aforementioned patent to Krupick et al. No. 3,354,726.

In addition, the flexure hinge assembly must permit tilting of the rotor about any transverse axis normal to the gyro's reference spin axis (Z-axis). This is accomplished by attributing to the flexure hinge assembly 2° of freedom in bending about the X- and Y-axis respectively. Moreover, since these axes and the rotation axis form a set of three mutually intersecting and orthogonal axes, it is apparent that the flexure hinge assembly must function as a universal-joint-coupling between the gyrorotor and the gyro's motor drive output shaft.

Actually, the present invention provides two such universal-joint-couplings in the presence of the inner and outer hinge units respectively, wherein both units act together in parallel. This is necessary because the gyrorotor must be adequately supported against lineal displacements in both the axial and radial directions. That is, the inner hinge unit 10 has its flexure bars 38, 30, 46 and 48 oriented so that their corresponding longitudinal axes are parallel to the flexure hinge assembly's Z-axis. With this arrangement, the flexure bars in the inner hinge unit will provide axial support in tension or compression against all axial loads imposed upon a gyro's rotor or inertial flywheel. Since the flexure bars in the inner hinge unit have little or no strength along directions normal to their respective longitudinal axes, the outer hinge unit is provided wherein its flexure bars are arranged to have their corresponding longitudinal axes, or axes of greatest strength, normal to those of the inner hinge unit. Thus, the flexure bars in the outer hinge unit provide maximum support in tension or compression against radial and/or torsional loads imposed upon the gyro's spinning rotor.

It may be noted in this connection, that the transverse dimensions of the flexure bars in the inner hinge unit are approximately one-half that of the corresponding transverse dimensions of the flexure bars in the outer hinge unit. This is because under axial loading all four flexure bars in the inner hinge unit act together in parallel in tension or compression to resist lineal displacement of the gyrorotor. However, under a given radial load it will be seen that only two flexure bars in the inner hinge unit will be so oriented as to resist such radial loading in tension or compression at any given moment. Another factor affecting the size of the transverse dimension of the various flexure bars in each hinge unit is the fact that each flexure bar actually comprises a cantilevered spring element and thus, in bending, will have a definite positive spring rate associated therewith tending to restore it to its original unflexed position. Since the spring rate of each flexure bar is intimately associated with the length of its bending axis, the transverse dimensions of the flexure bars in the inner and outer units are designed so that the two hinge units have equal deflection gradients along and at right angles to the spin axis over a wide range of loading conditions.

Returning again to FIG. 6, it will be recalled that upper circumferential weld 166 is effective to rigidly connect the upper gimbal ring 76 (outer hinge unit) to the upper gimbal ring 30 (inner hinge unit). In similar fashion, as indicated by the shaded area 168 in FIG. 6 (B), the lower circumferential weld 168 is effective to rigidly fix the lower inside peripheral surfaces of the outer hinge unit's middle gimbal portions 82 and 84 to the outside peripheral surfaces of the inner hinge unit's middle gimbal portions 34 and 36. Also, as shown in FIG. 6 (C), weld 170 and standoff recesses 138 and 140 combine to rigidly and integrally attach the rotor mounting ring to only the outside peripheral surfaces of the outer hinge unit's middle gimbal portions 34 and 36. As a result, the rotor mounting ring 14 is integrally supported by a pair of diametrically opposed middle gimbals displaced along the X-axis namely, a first middle gimbal comprising portions 34, 82 and a second gimbal comprising portions 36, 84. The middle gimbals are, in turn, supported for rotation about the X-axis relative to the upper gimbal ring 30, 76 via a first pair of juxtaposed, orthogonally aligned flexure bars 48 and 90 and a diametrically opposed second pair of juxtaposed, orthogonally aligned flexure bars 46 and 92. Whereas flexure bars 46 and 48 support the first and second gimbals and therefore the rotor mounting ring against axial loading, flexure bars 90 and 92 function to support the rotor mounting ring against torsional and radial loads.

Now with reference to FIG. 3, it is apparent that the various slots formed in the flexure hinge assembly will permit the rotor mounting ring and the first and second gimbals to which it is integrally attached, to freely rotate or angularly displace relative to the upper gimbal ring 30, 76 about the X-axis, that is, about an axis normal to he plane of the paper and centered at the cross axis location of the flexure bars as viewed in FIG. 3. In the absence of the angle stop ring 16 and the angle stop flange 18, this angular rotation of the rotor mounting ring (and therefore of the gyro's flywheel) would ordinarily be limited by the axial dimensions of slots 120, 130, 114, and 124. However, if this were allowed to happen limiting contact between the middle gimbals and the upper gimbal ring 76 across these slots would tend to transfer a reactive torque to the flexure bars which because of the latter's delicate and thin construction would be sufficient in most cases to dangerously overstress the flexure elements and in extreme cases might even result in the fracturing or rupturing of the flexure bars per se.

In accordance with the present invention therefore, angle stop ring 16 and angle stop flange 18 have been provided herein to safely limit the angular displacement of the rotor mounting ring 14 about the X-axis to a value less than that determined by the axial dimensions across slots 120, etc., whereby contact between the middle gimbals and the upper gimbal ring may be prevented. As previously described, the angle stop ring 16 and the angle stop flange 18 are fixed rigidly to the inner hinge unit's lower gimbal ring 32 through a pair of circumferential welds 172 and 174 (see FIG. 6 (A)). Inasmuch as the rotor mounting ring has freedom to tilt relative to the lower gimbal ring 32 as well as the upper gimbal ring 30, 76 it will be appreciated that the angular displacement of the ring 14, and therefore of the gyroscope's inertial flywheel, about the X-axis is effectively limited by the clearance space between the rotor mounting ring flange 136 and the angle stop flange 156. That is, the gyro's rotor will freely tilt about the X-axis until the rotor mounting flange 136 and the angle stop flange 156 and/or surface 150 of the angle stop ring rim portion come in contact with one another. Obviously, the clearance space between flanges 136 and 156 is chosen to be less than that corresponding to say, the axial dimensions of slot 130, for example.

With reference again being made to FIG. 6, it will be recalled that the inside peripheral wall surfaces of the outer hinge's lower gimbal portions 78 and 80 are effectively rigidly attached to the outside peripheral surfaces of the inner hinge's upstanding wall portions 42 and 44 through the medium of lower weld 168. The actual weld area joining these parts is represented by the shaded area 168' in FIG. 6 (B). Since, the upstanding wall portions 42 and 44 are integral with the inner hinge unit's lower gimbal ring 32 and elongate lower shaft 22, there is provided a diametrically opposed pair of lower gimbals displaced along the Y-axis namely, a first lower gimbal comprising lower gimbal portion 78 and upstanding wall portion 42, and a second lower gimbal comprising lower gimbal portion 80 and upstanding wall portion 44. The lower gimbals, in turn, support the upper gimbal ring 30, 76 for rotation relative to the elongate shaft 22 about the Y-axis through a third pair of juxtaposed, orthogonally aligned flexure bars 38 and 86 and a diametrically opposed fourth pair of juxtaposed, orthogonally aligned flexure bars 40 and 88. Here again, flexure bars 39 and 40 support the upper gimbal ring relative to the lower gimbals along the axial direction while flexure bars 86 and 88 provide radial and torsional support between the upper gimbal ring and the lower gimbals.

As best seen in FIG. 4, planar chordal slots 70 and 72, straight slots 66, 68, (and their extensions 66', 68'), and the various gimbal forming rectangular slots permit the upper gimbal ring 30, 76 to freely rotate or angularly displace relative to the lower elongate shaft 22 about the Y-axis, i.e., about an axis normal to the plane of the paper and intersecting the cross axis location of the flexure bars as viewed in FIG. 4. In this regard, it is to be noted that because of the quadrature relationship between the diametrically opposed middle gimbals on one hand, and the diametrically opposed lower gimbals on the other hand, the rotor mounting ring 14 (or the gyro's inertial flywheel) cannot directly pivot freely about the Y-axis relative to the elongate shaft 22. Rather, precessional torque is transferred to upper gimbal ring which then pivots relative to the shaft 22 through flexure bars 38, 86 and 40, 88, and the lower gimbals, respectively. The resulting two-axis freedom in bending enables the rotor mounting ring to tilt or pivot relative to shaft 22 about any transverse axis passing through the flexure hinge assembly in the X-Y plane while the entire flexure assembly rotates about the Z-axis and thus establishes the universal-joint-coupling characteristic of the present invention.

As mentioned above in connection with FIG. 3, the angle stop ring 16 and the angle stop flange 18 are rigidly fixed to the lower ring 32. Accordingly, angular displacement of the rotor mounting ring about the Y-axis relative to the elongate shaft 22 and through the upper gimbal ring as just described will be safely limited by the cooperation of the rotor mounting ring flange 136 with the angle stop flange 156. Thus, in either case, freedom of tilt of the rotor mounting ring about the X- or Y-axis is effectively limited by the clearance space between flanges 136 and 156 and this will be equally true with respect to tilt of the gyrorotor about any transverse axis in the X-Y plane.

It is apparent from the foregoing description that the present invention provides a one-piece, frictionless, two-axis gimballed hinge element that serves as a compound universal-joint member between the shaft 22 and the rotor mounting ring 14. The flexure hinge assembly disclosed herein is not only capable of imparting rotation from the shaft to the rotor mounting ring about a spin or reference axis while permitting relative tilting of the flange ring relative to the shaft about any transverse axis perpendicular to said spin axis but moreover, is capable of providing the necessary support for preventing lineal displacement of said rotor mounting ring either radially or axially with respect to the gyro spin axis.

The represent flexure hinge assembly, therefore, retains all of the advantages of the prior art hinge and has the additional advantage of being considerably easier to fabricate, thereby resulting in higher accuracy of finish, greater reliability, and lower per unit cost. Furthermore, as explained above, the unique angle stop apparatus disclosed in connection with the present flexure hinge effectively prevents damage of the flexure hinge assembly, particularly with respect to the delicately thin flexure bars or elements which heretofore remained quite vulnerable throughout the manufacturing and assembly process and in subsequent operation as well. This is true because as pointed out previously in the absence of the angle stop ring and the angle stop flange, displacement of the gyroscopic rotor beyond a predetermined safe limit tends to stress the flexure bars and/or rupture or fracture same. And although a preferred embodiment of the present invention has been disclosed herein above as required by statute, it will be noted that various modifications and alterations therein may be carried out by those skilled in the art. For example, as previously mentioned, in gyroscope flexure hinges of the type described herein the flexure bars act as spring elements exerting positive spring-rate restoring forces when they are in their flexed condition, that is, when the gyro's rotor pivots relative to the spin axis. These forces tend to oppose the rotor's displacement and thereby act as restraining torques on the rotor causing it to drift at right angles to the original displacement. In order to cancel out such undesireable torque restraints, so called spring-rate compensation means are usually provided. A spring-rate compensator suitable for use with the present invention is disclosed in the aforementioned patent to Krupick et al.; however, it is anticipated that the improved spring-rate compensating means fully disclosed in the aforementioned copending application, Ser. No. 761,148 will be preferred by those skilled in the art. In any event, it will be noted that the spring-rate compensator is to be fixedly and concentrically mounted within the flexure hinge's "tunable" portion, that is, the portion which oscillates when the spinning rotor is tilted relative to the spin axis. For example, in the prior art hinge, the "tunable" element comprises the middle gimbal portion of the inner hinge unit, whereas in the present invention the "tunable" element comprises the integral upper gimbal ring structure 30, 76.

I claim:

1. Apparatus for supporting a gyroscopic inertial flywheel for rotation about a first principal axis and for angular displacement about second and third principal axes mutually perpendicular and intersecting with respect to said first axis comprising:

an upper gimbal ring coaxially related to said first principal axis;

an elongate shaft coaxial with respect to said first principal axis and having a pair of diametrically opposed, displaced lower gimbals supported on the axial upper end thereof along said second principal axis;

a first pair of diametrically opposed flexure elements respectively integral between said pair of lower gimbals and said gimbal ring for supporting said gimbal ring relative to said elongate shaft and for permitting said gimbal ring to tilt relative to said shaft about said second principal axis;

a pair of diametrically opposed displaced middle gimbals positioned along said third principal axis and integrally supported from said gimbal ring by a second pair of diametrically opposed flexure elements;

each of said flexure elements comprising a pair of necked-down sections of said cylindrical wall member, one of which has its longitudinal axis aligned parallel to said first principal axis and the other one of which has its longitudinal axis aligned parallel to one other of said principal axes; and a rotor mounting ring integrally supported by said pair of middle gimbals in a coaxial manner relative to said first principal axis, whereby said second pair of flexure elements permit said middle gimbals and said rotor mounting ring to angularly tilt or bend about said third principal axis, said rotor mounting element being adapted to support a gyroscopic flywheel relative to said elongate shaft.

2. The apparatus of claim 1 wherein said elongate shaft has integrally attached thereto angle stop means for limiting the angular displacement of said rotor mounting element about said second and third principal axes;

3. A universal joint flexure hinge element for use in a gyroscopic suspension apparatus comprising:

a hollow cylindrical member symmetrically disposed about a set of three principal mutually intersecting and orthogonal axes;

an elongate shaft integral with the lower axial end of said hollow cylindrical member and coaxial with respect thereto and to a first one of said principal axes, said member including a lower gimbal ring adjacent to said integral elongate shaft;
a pair of diametrically opposed upstanding wall portions spaced along a second one of said principal axes;
an upper gimbal ring, said upper gimbal ring being supported for angular rotation about said second principal axis by a diametrically opposed pair of flexure elements integral therewith and with said upstanding wall portions, respectively;
a pair of diametrically opposed arcuately shaped middle gimbal portions in quadrature with said pair of upstanding wall portions and spaced along a third one of said principal axes, said middle gimbal portions being supported from said upper gimbal ring by a second pair of diametrically opposed flexure elements spaced along said third principal axis and adapted to support said middle gimbal portions for angular rotation about said third principal axis relative to said upper gimbal ring;
said first and second pairs of diametrically opposed flexure elements comprising thin necked-down sections of said cylindrical wall member having their longitudinal axes parallel to said first principal axis and their transverse bending axes aligned along said second or third principal axis, respectively, whereby a gyroscopic inertial element may be integrally supported by said middle gimbal portions for two-axis angular displacement relative to said elongate shaft.

4. The apparatus of claim 3 wherein said elongate shaft is adapted to receive torque from a gyroscope drive means to cause said lower gimbal ring and said middle gimbal portions and said upper gimbal to rotate about said first principal axis.

5. A universal joint flexure hinge element for use in gyroscopic suspension apparatus comprising:
a hollow cylindrical member symmetrically disposed about a set of three principal mutually intersecting and orthogonal axes, said hollow cylindrical member including an upper ring gimbal coaxially related to a first one of said axes, a pair of diametrically opposed cutaway wall portions displaced along a second one of said principal axes, said cutaway wall portions being supported for angular rotation about said second axis relative to said gimbal upper ring by a corresponding pair of diametrically opposed flexure elements,
said member further including a pair of diametrically opposed lower gimbal portions cut away from the wall of said hollow cylindrical member and displaced along a third one of said principal axes, said lower gimbal cutaway wall portions being supported from said upper ring gimbal by a second pair of diametrically opposed flexure elements adapted to permit said upper gimbal ring to angularly rotate relative to said lower gimbal portions about said third principal axis, and
wherein said first and second pairs of diametrically opposed flexure elements comprise locally thin necked-down sections of said cylindrical wall member each of which has a longitudinal axis normal to said first principal axis and a transverse bending axis aligned parallel to either said second or third principal axes, respectively.

6. The apparatus of claim 5 wherein said pair of diametrical opposed cutaway middle gimbal portions is adapted to support a gyroscope inertial element and wherein said pair of diametrically opposed lower gimbal cutaway cylindrical wall portions is adapted to integrally fixed relative to a gyroscope drive means, said means being effective to cause said lower gimbal wall portions to be rotated about said first principal axis.

7. The combination comprising:
an inner flexure hinge unit for permitting universal tilting and rotation about a gyroscope spin reference axis;
an outer flexure hinge unit for permitting universal tilting and rotation about said spin reference axis concentrically and integrally fixed to said inner hinge unit and adapted to coaxially support a gyroscope inertial element, said outer hinge unit comprising a hollow cylindrically shaped member having an upper gimbal portion, a pair of diametrically opposed middle gimbal portions, and a pair of diametrically opposed lower gimbal portions in quadrature with said middle gimbal portions, said middle gimbal portions being respectively supported from said upper gimbal portions by a first pair of diametrically opposed flexure elements permitting said middle gimbal portions to pivot about an axis perpendicular to and intersecting said spin reference axis, said middle gimbal portions having a gyroscope inertial element support ring attached to their outside peripheral surfaces, respectively, and said lower gimbal portions being respectively supported from said upper gimbal portion by a second pair of diametrically opposed flexure elements permitting said lower gimbal portions to pivot about a second axis mutually perpendicular and intersecting said spin axis and said first axis; and,
an angle stop means fixed to said inner hinge unit and adapted to limit the tilting of said inertial element relative to said spin axis.

8. The combination of claim 7 wherein said inner hinge unit comprises:
a lower ring gimbal coaxially disposed about said spin axis and having integrally attached thereto an elongate shaft portion coaxially related to said spin axis, and;
an upper ring gimbal supported relative to said lower ring gimbal by a first pair of diametrically opposed flexure elements, said flexure elements being adapted to permit said upper ring gimbal to pivot relative to said lower ring gimbal about a first axis perpendicular to and intersecting said spin reference axis, said upper ring gimbal having a second pair of diametrically opposed flexure elements supported therefrom and having a corresponding pair of diametrically opposed middle gimbals fixedly secured thereto, said second pair of flexure elements permitting said pair of middle gimbals to pivot relative to said upper ring gimbal about a second axis mutually perpendicular to and intersecting said spin axis and said first axis.

9. The combination comprising:
an inner flexure hinge unit for permitting universal tilting and rotation about a gyroscope spin reference axis, said inner flexure hinge unit comprising a lower ring gimbal coaxially disposed about said spin axis and having integrally attached thereto an elongate shaft portion coaxially related to said spin axis, and an upper ring gimbal supported relative to said lower ring gimbal by a first pair of diametrically opposed flexure elements, said flexure elements being adapted to permit said upper ring gimbal to pivot relative to said lower ring gimbal about a first axis perpendicular to and intersecting said spin reference axis, said upper ring gimbal having a second pair of diametrically opposed flexure elements supported therefrom and having a corresponding pair of diametrically opposed middle gimbals fixedly secured thereto, said second pair of flexure elements permitting said pair of middle gimbals to pivot relative to said upper ring gimbal about a second axis mutually perpendicular to and intersection said spin axis and said first axis;
an outer flexure hinge unit for permitting universal tilting and rotation about said spin reference axis concentrically and integrally fixed to said inner unit and adapted to coaxially support a gyroscope inertial element, said outer flexure hinge unit comprising a hollow cylindrically shaped member having an upper gimbal portion, a pair of diametrically opposed middle gimbal portions, and a pair of diametrically opposed lower gimbal portions in quadrature with said middle gimbal portions, said middle gimbal portions being respectively supported from said upper gimbal portions by a first pair of diametrically opposed flexure elements whereby said first pair of flexure elements permit said middle gimbal portions to pivot about a first axis perpendicular to and intersecting said spin reference axis, said middle gimbal portions having a gyroscope inertial element support ring attached to their outside peripheral surfaces, respectively, and said lower gimbal portions being respectively supported from said upper gimbal portion by a second pair of diametrically opposed flexure elements whereby said second pair of flexure elements permit said lower gimbal portions to pivot about a second axis mutually perpendicular and intersecting said spin axis and said first axis, the outside peripheral surface of said inner hinge unit's upper ring gimbal being integrally fastened to the inside peripheral surface of said outer hinge unit's upper gimbal portion, the outside peripheral surfaces of said inner hinge unit's middle gimbals being integrally fastened to the inside peripheral surfaces of said outer hinge unit's middle gimbal portions respectively, and the outside peripheral surface of said inner hinge unit's lower ring gimbal being fixedly attached to the inside peripheral surface of said outer hinge unit's lower gimbal portion; and an angle stop means fixed to said inner hinge unit and adapted to limit the tilting of said inertial element relative to said spin axis.

10. A combination comprising:

universal-joint flexure hinge means for coupling a gyroscopic inertial flywheel to a drive shaft and for causing said flywheel to rotate about a spin axis coaxial to said shaft, said hinge means being further adapted to permit said flywheel to tilt about an axis perpendicular to said spin axis during rotation thereof, said flexure hinge means including an input shaft for receiving torque from a gyroscope motor drive shaft to cause said rotation about said spin axis, and a flywheel support ring coaxially supported by said hinge means for rotation about said spin axis, said tilt limiting means including a ring radially extending from said spin axis, and integrally fixed to said input shaft, said ring being axially spaced from said flywheel support ring along said spin axis, said ring further including an outer flange member rigidly fixed thereto, said flange member having an inwardly radially extending lip portion relative to said spin axis and being axially positioned therealong so as to engage the outer extremity of said flywheel support ring after a predetermined magnitude of tilt thereof about said perpendicular axis; and means for limiting the magnitude of tilt about said axis.

11. In a gyroscope rotor suspension having an inner, four-bar, two-axis, universal-joint flexure hinge and an outer, four-bar, two-axis universal-joint flexure hinge the method of assembly comprising the steps of:

machining four equiangularly arranged pairs of adjacently spaced holes through the wall of a hollow cylindrical workpiece to form said inner hinge unit wherein said flexure bars comprise the respective necked-down wall portions between each pair of adjacently spaced holes;

machining four equiangularly arranged pairs of adjacently separated holes through the wall of a hollow cylindrical workpiece having an inside diameter substantially equal to the outside diameter of said first cylindrical workpiece to form said outer hinge unit wherein said flexure bars comprise the respective necked-down wall portions between each pair of adjacently spaced holes, said wall portions in said outer hinge unit being orthogonally oriented relative to the wall portions in said inner hinge unit;

positioning the inner hinge unit concentrically within the outer hinge unit whereby said orthogonally oriented wall portions common to said hinge units respectively have their extreme necked-down portions in corresponding alignment;

fixedly fastening said inner hinge unit to said outer hinge unit to form a rigid unitary structure;

machining a first series of gimbal forming slots in the rigid unitary structure;

fixedly fastening a rotor mounting ring to the outside periphery of said rigid unitary structure;

fixedly fastening an angle stop means to the outside periphery of said rigid unitary structure in axially spaced relation to said rotor mounting ring, and;

machining a second and final series of gimbal forming slots in said rigid unitary structure sufficient to permit said rotor mounting ring to tilt relative to a portion of a said inner hinge unit about a pair of orthogonal axes defined respectively by the alignment of said orthogonally oriented wall portions, said axes being normal and in common intersecting relation with a reference axis passing longitudinally and centrally through said workpiece, the magnitude of tilt of said rotor mounting ring being limited by said angle stop means.

12. The method of claim 11 wherein said rigid unitary workpiece has an elongate portion axially protruding from said inner hinge unit and said angle stop means is rigidly fastened to said elongate protruding portion wherein said angle stop means comprises a radially extending ring member fixedly fastened to said inner hinge unit as hereinaforesaid, an axially extending cylindrical flange member fixedly secured to the outside periphery of said ring member, said flange member further including a radially inwardly extending lip portion for overlying the circumferential outer portion of said rotor mounting ring wherein said angle stop ring and said angle stop flange are accurately positioned relative to said rotor mounting ring and to each other respectively before being fixedly fastened to each other and said inner hinge unit respectively.

13. The method of claim 12 wherein said flange member and said ring member are accurately positioned relative to each other and to said rotor mounting ring by inserting a shim between said circumferentially overlying radially inwardly extending lip portion and said rotor mounting ring outer portion through a hole formed in the wall of said flange, and, clamping said flange, said rotor mounting ring, and said radially extending ring together.

PO-1050
(5/69)

UNITED STATES PATENT OFFICE
CERTIFICATE OF CORRECTION

Patent No. 3,585,866    Dated June 22, 1971

Inventor(s) Willis B. Ensinger

It is certified that error appears in the above-identified patent and that said Letters Patent are hereby corrected as shown below:

Col. 1, line 32 - delete "shaf's" and insert --shaft's--

Col. 1, line 42, delete "tow" and insert --two--

Col. 1, line 67, delete "bolts" and insert --slots--

Col. 1, line 73, after "each" insert --hinge--

Col. 2, line 12, delete "positioned" and insert --position--

Col. 2, line 46, delete "stops" and insert --stop--

Col. 3, line 2, after "perspective" delete "in" and insert --the--

Col. 3, line 52, after "22" delete "at" and insert --as--

Col. 3, line 70, after "first" delete "part" and insert --pair--

Col. 4, line 45, delete "he" and insert --the--

Col. 5, line 5, after "permits" delete "he" and insert --the--

Col. 5, line 12, delete "tile" and insert --tilt--

Col. 5, line 54, correct spelling of the word "axis"

Col. 5, line 61, after "82" delete period (.) and insert comma (,)

Col. 6, line 2, after "gimbal" delete "portion" and insert --ring--

Col. 6, line 63, delete "the" and insert --that--

Col. 8, line 17, after "are" insert --the--

Col. 8, line 24, after "are" insert --then--

Col. 9, line 63, after "spaced" insert --directly below--

UNITED STATES PATENT OFFICE
CERTIFICATE OF CORRECTION

Patent No. 3,585,866     Dated June 22, 1971

Inventor(s) Willis B. Ensinger     PAGE - 2

It is certified that error appears in the above-identified patent and that said Letters Patent are hereby corrected as shown below:

- PAGE TWO -

Col. 11, line 34, delete "position" and insert --positions--

Col. 14, line 46, after "120" insert --130--

Col. 14, line 64, delete "dimensions" and insert --dimension--

Col. 15, line 9, after "bars" delete "39" and insert --38--

Claim 9, line 60, delete "intersection" and insert --intersecting--

Signed and sealed this 15th day of February 1972.

(SEAL)
Attest:

EDWARD M. FLETCHER, JR.     ROBERT GOTTSCHALK
Attesting Officer           Commissioner of Patents